(12) United States Patent
Wang et al.

(10) Patent No.: US 8,467,439 B2
(45) Date of Patent: Jun. 18, 2013

(54) ADAPTIVELY SWITCHING EQUALIZATION OPERATIONS IN A NODE OF A WIRELESS NETWORK

(75) Inventors: Yi-Pin Eric Wang, Fremont, CA (US); Tore Mikael André, Älvsjö (SE); Jinliang Huang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 206 days.

(21) Appl. No.: 13/117,583

(22) Filed: May 27, 2011

(65) Prior Publication Data

US 2012/0300829 A1 Nov. 29, 2012

(51) Int. Cl.
*H03K 5/159* (2006.01)

(52) U.S. Cl.
USPC .......... 375/232; 375/261; 375/347; 375/340; 375/262; 375/264; 370/252

(58) Field of Classification Search
USPC ... 375/232, 261, 347, 262, 264, 340; 370/252
See application file for complete search history.

(56) References Cited

U.S. PATENT DOCUMENTS

| | | | |
|---|---|---|---|
| 5,541,956 A | 7/1996 | Ueda | |
| 6,819,630 B1 | 11/2004 | Blackmon et al. | |
| 8,340,202 B2 * | 12/2012 | Huss et al. | 375/261 |
| 2003/0223489 A1 | 12/2003 | Smee et al. | |
| 2006/0262886 A1* | 11/2006 | Lozhkin | 375/347 |
| 2010/0260252 A1* | 10/2010 | Landau et al. | 375/232 |
| 2011/0222618 A1* | 9/2011 | Huss et al. | 375/261 |
| 2012/0201333 A1* | 8/2012 | Okamoto et al. | 375/340 |

FOREIGN PATENT DOCUMENTS

| | | |
|---|---|---|
| EP | 1 179 934 A1 | 2/2002 |
| EP | 1 830 529 A1 | 9/2007 |

OTHER PUBLICATIONS

International Search Report and Written Opinion mailed Sep. 3, 2012 in corresponding International Application No. PCT/IB2012/052622 (11 pages).
John M. Cioffi et al., "MMSE Decision-Feedback Equalizers and Coding—Part I: Equalization Results", IEEE Transactions on Communications, vol. 43, No. 10, Oct. 1995, pp. 2582-2594.
John M. Cioffi et al., "MMSE Decision-Feedback Equalizers and Coding—Part II: Coding Results", IEEE Transactions on Communications, vol. 43, No. 10, Oct. 1995, pp. 2595-2604.
Gilberto Berardinelli et al., "Improving SC-FDMA Performance by Turbo Equalization in UTRA LTE Uplink", Department of Electronic Systems, Aalborg University, 2008, pp. 2557-2561.
Chester Sungchung Park et al., "Evolution of Uplink MIMO for LTE-Advanced", IMT-Advanced and Next-Generation Mobile Networks, IEEE Communications Magazine, Feb. 2011, pp. 112-121.

\* cited by examiner

*Primary Examiner* — Eva Puente
(74) *Attorney, Agent, or Firm* — Nixon & Vanderhye P.C.

(57) ABSTRACT

At a node of a wireless network, equalization operations performed on signals received from a transmitter are adaptively switched to be equalized by an iterative turbo receiver or a linear receiver. A theoretical expression of a post-equalization SINR of a capacity-achieving receiver is used to estimate the post-equalization SINR performance of the turbo receiver. The estimated post-equalization SINR performance is then used as a basis to determine whether the received signal is to be equalized by the turbo receiver or the linear receiver.

20 Claims, 10 Drawing Sheets

ADAPTIVELY SWITCHING EQUALIZATION OPERATIONS IN A NODE OF A WIRELESS NETWORK

RELATED APPLICATION

Technical field of present disclosure may be related to U.S. patent application Ser. No. 12/752,471 entitled "Channel Quality Estimation for MLSE Receiver" filed on Apr. 1, 2010. The subject matter of the related application is incorporated by reference in its entirety herein.

TECHNICAL FIELD

Technical field of present disclosure relates to adaptively switching equalization operations in a node of a wireless network, and in particular to adaptively switching between turbo equalization operation and other equalization operations based on expected performance of the turbo equalization operation.

BACKGROUND AND SUMMARY

In Long-Term Evolution (LTE), single-carrier frequency-division multiple-access (SC-FDMA) is used in the uplink. SC-FDMA is advantageous in terms of power amplifier efficiency as it has a smaller peak-to-average power ratio (PAPR) than an orthogonal frequency division multiple access (OFDMA) signal. SC-FDMA, however, gives rise to an inter-symbol interference (ISI) problem in dispersive channels. It is important to address ISI so that SC-FDMA can improve power amplifier efficiency without sacrificing performance.

When LTE is first rolled out, it is likely that linear minimum mean square error (LMMSE) receivers will be implemented in the base station, also referred to as an eNodeB. LMMSE receivers suppress ISI using linear frequency-domain equalization, where the filter coefficients are designed to maximize the signal-to-interference-plus-noise ratio (SINR) for each subcarrier component. Compared to a simple match filtering receiver, LMMSE provides a significant performance improvement.

But it is thought that even better performance can be achieved by employing even more advanced receiver techniques. For example, there have been interests in using a turbo receiver (or turbo equalizer) in uplink LTE to improve performance in ISI channels beyond LMMSE. However, the complexity of a turbo receiver is high. Thus, it is advantageous to turn on the iterative turbo processing only when there is a good chance of performance improvement from the turbo processing.

A method has been proposed to adaptively switch on and off the iterative turbo operation. This previous method is based on the post-equalization SINR's of an MMSE receiver and a turbo receiver. Comparing these two SINR gives rise to a gain factor G. In the calculation of the turbo receiver SINR, it is assumed that the ISI in the turbo receiver is completely removed. The previous method further depends on an estimated average bit error rate (BER) indicator, $\bar{B}$. Whether the iterative turbo operation is activated or not is determined based on G and $\bar{B}$.

While the previous method has been shown to be effective, an even better solution may be achievable through estimating performance using, for example, a capacity-achieving receiver.

SUMMARY

A non-limiting aspect of the disclosed subject matter is directed to a method to adaptively switch equalization operations in a wireless network. The method may be performed at or on behalf of a node of the wireless network. The method comprises receiving wirelessly a signal from a transmitter; estimating a post-equalization SINR performance of a turbo equalization operation based on the received signal; and selecting, based on the estimated post-equalization SINR performance of the turbo equalization operation, one of a turbo equalization operation and a linear equalization operation to equalize the received signal. The process to estimate the post-equalization SINR performance the turbo equalization operation comprises determining per-subcarrier SINRs for a plurality of subcarriers allocated to the received signal; determining per-subcarrier capacities for the subcarriers allocated to the received signal based on the per-subcarrier SINRs; and estimating a post-equalization SINR performance of the turbo equalization operation based on the per-subcarrier capacities of the subcarriers.

Another non-limiting aspect of the disclosed subject matter is directed to a node of a wireless network structured to adaptively switch equalization operations. The node comprises a turbo receiver structured to perform a turbo equalization operation on a received signal; a linear receiver structured to perform a linear equalization operation on the received signal; a turbo performance estimator structured to estimate a post-equalization SINR performance of the turbo receiver based on the received signal; and a switch controller structured to switch the received signal to be equalized by one of the turbo receiver and the linear receiver based on the estimated post-equalization SINR performance of the turbo receiver. The turbo performance estimator is structured to estimate the post-equalization SINR performance of the turbo receiver by determining per-subcarrier SINRs for a plurality of subcarriers allocated to the received signal, determining per-subcarrier capacities for the subcarriers allocated to the received signal based on the per-subcarrier SINRs, and estimating a post-equalization SINR performance of the turbo receiver based on the per-subcarrier capacities of the subcarriers.

Yet another non-limiting aspect of the disclosed subject matter is directed to a non-transitory computer storage medium which has stored therein programming instructions. When a computer executes the programming instructions, the computer executes a method to adaptively switch equalization operations in a wireless network. The method may be performed at or on behalf of a node of the wireless network. The method comprises receiving wirelessly a signal from a transmitter; estimating a post-equalization SINR performance of a turbo equalization operation based on the received signal; and selecting, based on the estimated post-equalization SINR performance of the turbo equalization operation, one of a turbo equalization operation and a linear equalization operation to equalize the received signal. The process to estimate the post-equalization SINR performance the turbo equalization operation comprises determining per-subcarrier SINRs for a plurality of subcarriers allocated to the received signal; determining per-subcarrier capacities for the subcarriers allocated to the received signal based on the per-subcarrier SINRs; and estimating a post-equalization SINR performance of the turbo equalization operation based on the per-subcarrier capacities of the subcarriers.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP, and in particular LTE, is primarily used as examples for explanation purposes. Note that the technology described herein can be applied to non-3GPP standards such as cdma2000, EV-DO, TD-SCDMA, or other 3GPP standards such as WCDMA and HSPA. Thus, the scope of this disclosure is not limited to the set of 3GPP wireless network systems and can encompass many domains of wireless network systems. Also, a base station (e.g. RBS, NodeB, eNodeB, eNB, etc.) will be used as an example of a network node in which the described method can be performed. However, it should be noted that the disclosed subject matter is applicable to any node, such as relay stations, that receive wireless signals. Also without loss of generality, mobile terminals (e.g. UE, mobile computer, PDA, etc.) will be used as examples of wireless terminals that communicate with the base station.

Figure 1:
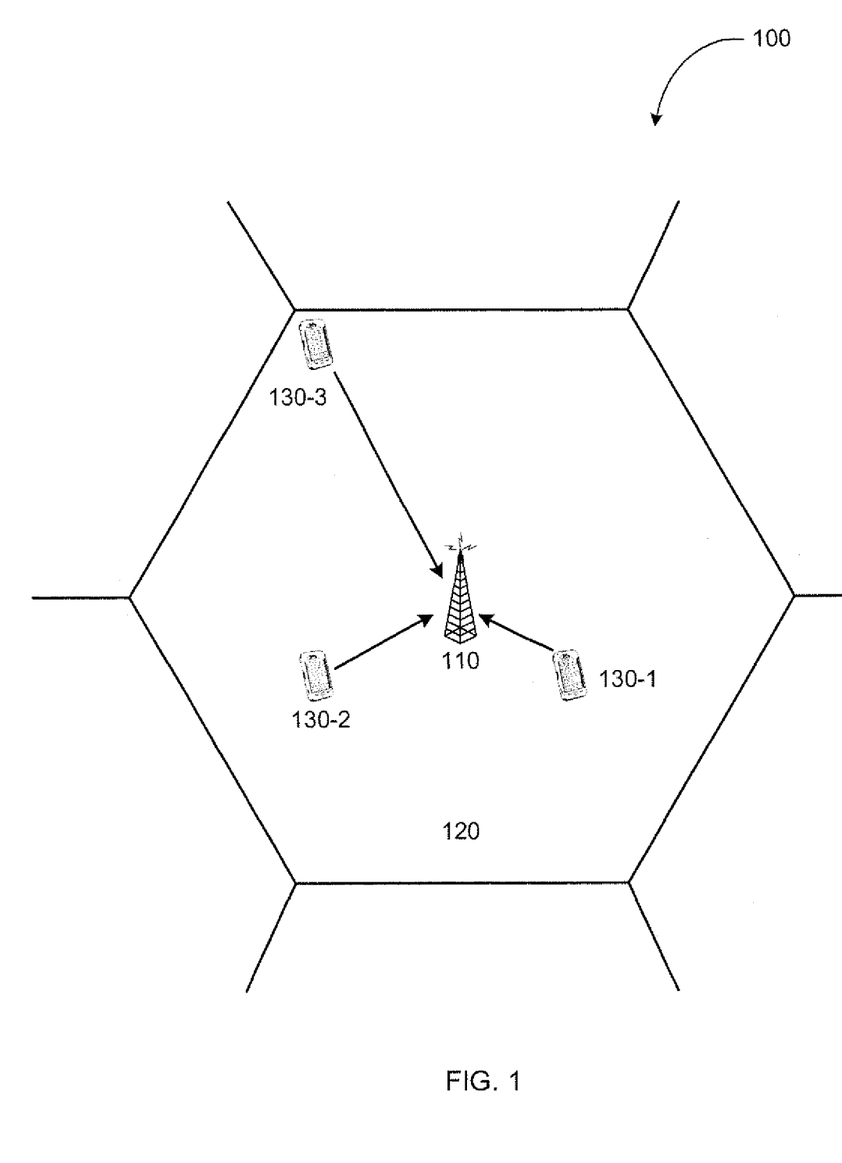
FIG. 1 illustrates an example scenario of a wireless network in which mobile terminals and base station communicate with each other.

FIG. 1 illustrates an example scenario of a wireless network 100 in which mobile terminals 130 and a base station 110 communicate with each other. At the base station 110, signals transmitted from any mobile station 130 are equalized to increase the effective SINR of the communication link between the base station 110 and the mobile terminal 130.

In this scenario, the base station 110 as the receiver of the signals transmitted from the transmitters (the mobile terminals 130) performs the equalization of the signals. However, this is not a limitation. Any network node may be able to perform such equalization. Indeed, in the downlink direction, it is contemplated that some or all mobile terminals 130 may also perform equalization processes to which one or more aspects of the disclosed subject matter are applicable. For ease of explanation however, it is assumed that the equalization is performed at the base station 110.

Figure 2:
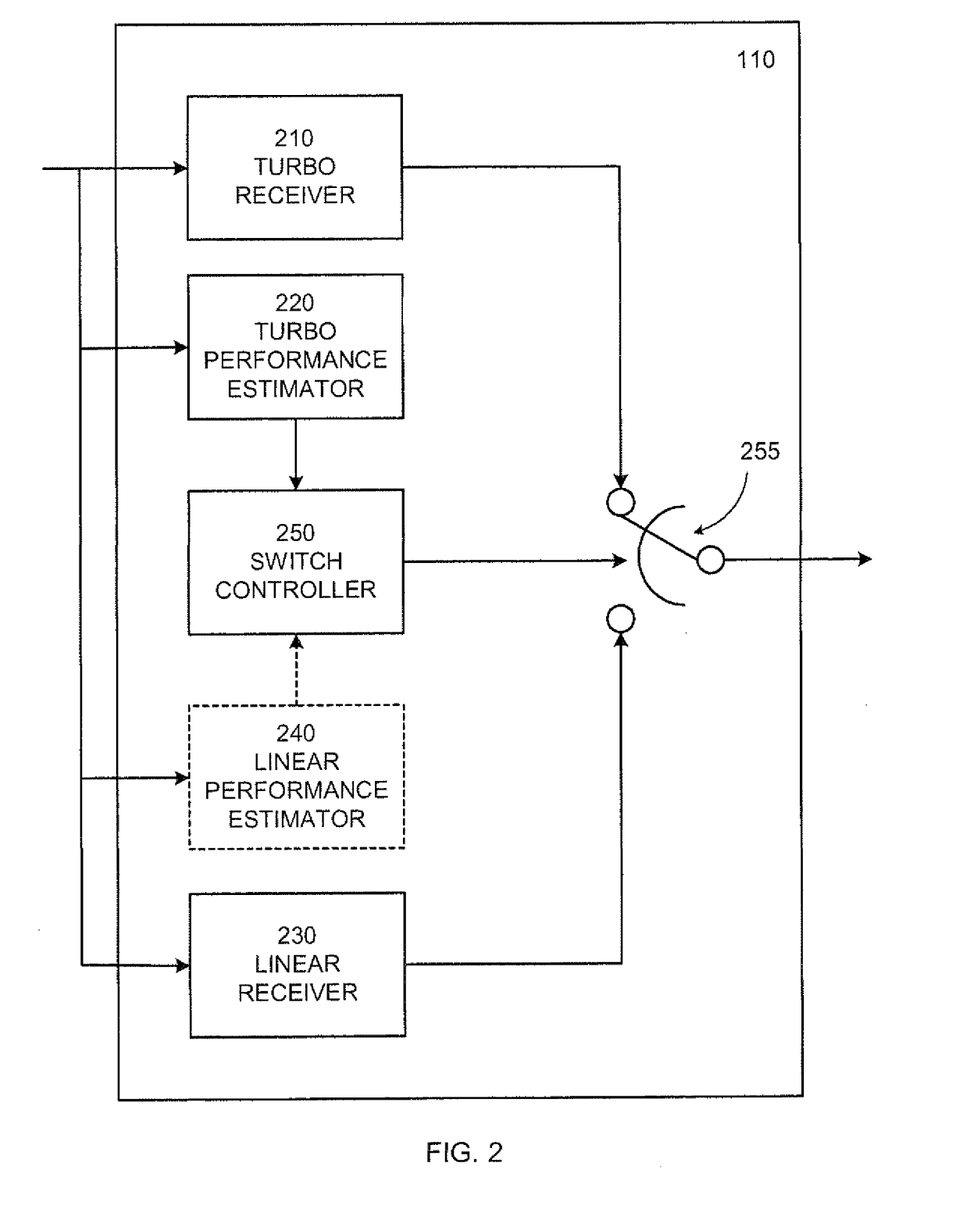
FIG. 2 illustrates an example embodiment of a node of a wireless network.

FIG. 2 illustrates an example embodiment of a base station 110 of a wireless network 100. As seen, the example base station 110 includes a turbo receiver 210, a turbo performance estimator 220, a linear receiver 230, a linear performance estimator 240, a switch controller 250, and a switch 255. The linear performance estimator 240 is shown as a dashed box to indicate that it is optional.

These units of the base station 110 are structured to adaptively switch equalization operations performed on the incoming signal. Since the base station 110 is but one of several nodes of the network 100 that can perform the adaptive switching operations, the terms "node", and "base station" and variance thereof (e.g. NodeB, eNodeD, eNB, etc.), may be used interchangeably. Thus, FIG. 2 may be viewed as an embodiment of a node 110 capable of performing adaptive switching operations.

It should be noted that FIG. 2 is a logical representation of the node 110. Thus, each of the units (the turbo receiver 210, the turbo performance estimator 220, the linear receiver 230, the linear performance estimator 240, the switch controller 250, the switch 255), need not be physically separate from any of the other units. It is fully contemplated that any combination of the units may be integrated into a single physical device. Further, any of the units may be implemented in multiple physical components operatively structured and coupled to each other to perform the respective function of the unit. Yet further, to the extent that some of the units share common features, multiple units may share common components.

While not explicitly shown, it is also contemplated that the node 110 as a whole can be implemented as a combination of hardware and software components. For example, the node 110 may include one or more processors, which as described above can be combinations of hardware and software arranged to perform the functions associated with the units.

The processor(s) may execute programming instructions stored in a non-transitory computer-readable medium to perform the functions. The programming instructions may also be received in a transitory manner and stored in the non-transitory computer-readable medium accessible to the node 110.

Figure 3:
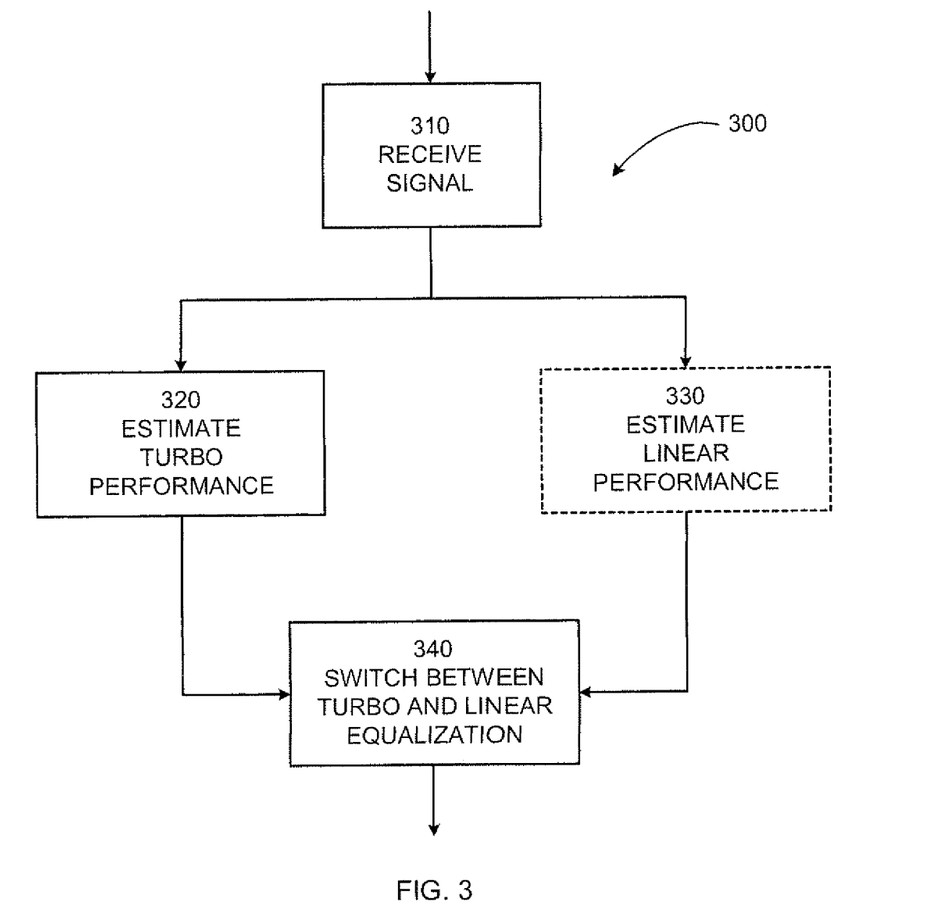
FIG. 3 illustrates an example method to adaptively switch equalization operations.

FIG. 3 illustrates an example method to adaptively switch equalization operations. This method may be performed at or on behalf of the node 110 of the wireless network. From one perspective, the method 300 may be described as capturing the expected gain of the turbo receiver 210 through an SINR expression of a capacity achieving receiver. This way of capturing the post-equalization SINR may better characterize the actual performance of the turbo equalization operation performed by the turbo receiver 210. As a consequence, better decisions may be made in determining whether the iterative turbo operation should be activated or not.

The method 300 begins in step 310 when a signal from a transmitter 130 is wirelessly received. Based on the received signal, the turbo performance estimator 220 estimates a post-equalization SINR performance $\gamma_T$ of the turbo equalization operation performed by, for example, the turbo receiver 210 in step 320. In step 340, the switch controller 250 switches or selects the received signal to be equalized by either the turbo receiver 210 or the linear receiver 230 based on the estimated post-equalization SINR performance $\gamma_T$ of the turbo receiver 210. Optionally, the linear performance estimator 240 may estimate the post-equalization SINR performance $\gamma_M$ of the linear equalization operation performed by, for example, the linear receiver 230, and the switch controller 250 may select or switch the received signal also based on the estimated performance of the linear receiver 230. Thus, in one embodiment, the switching decision made by the switch controller 250 is based on the estimated performance $\gamma_T$ of the turbo receiver 210 alone, and in another embodiments, the switching decision is based on the estimated performances $\gamma_T$, $\gamma_M$ of both the turbo and linear receivers 210, 230.

The terms "switch" and "switching" should not be taken to be limiting. That is, the terms are broader than simply operating the switch 255 to multiplex the outputs of the turbo receiver 210 and the linear receiver 230 based on the estimated performances as illustrated in FIG. 2. Rather, these terms are intended to be interpreted broadly to incorporate the concepts of "activating", "enabling", "causing", "selecting," and so on. In other words, in step 340, the switch controller 250 takes actions to ensure that the proper equalization operation is performed on the received signal. For example, in particular embodiments, switch controller 250 and switch 255 may represent a processor or multiple processors capable of selecting an appropriate equalization operation to perform or of selecting for further use one the outputs generated by multiple different equalization operations that are performed in parallel on received signals.

Figure 4:
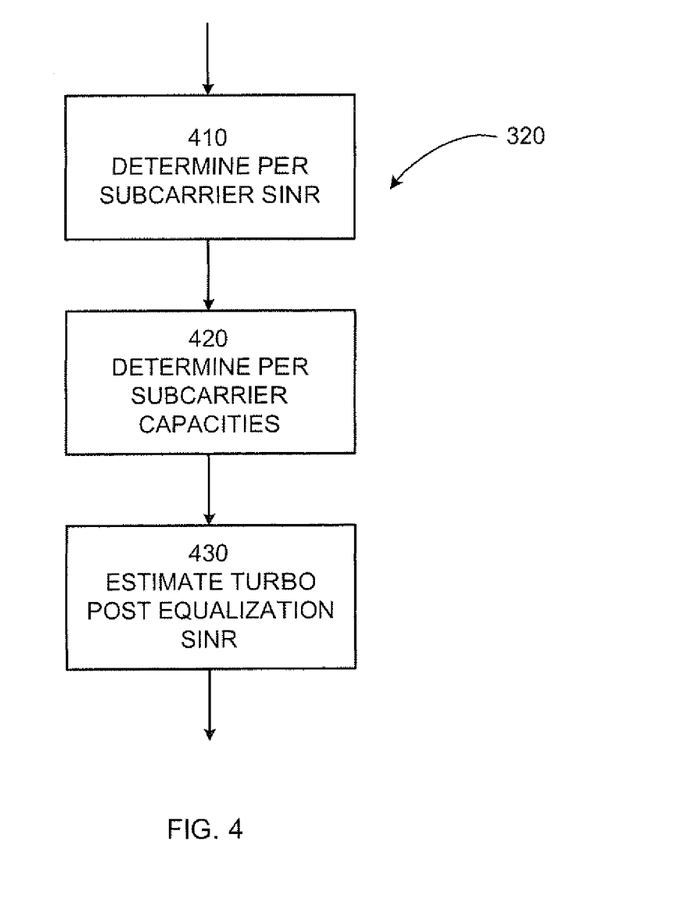
FIG. 4 illustrates an example process to estimate a post-equalization SINR performance of a turbo receiver.

FIG. 4 illustrates an example process to implement step 320 performed by the turbo performance estimator 220 to estimate the post-equalization SINR performance $\gamma_T$ of the turbo receiver 210. In step 410 of the process, the per-subcarrier SINRs are determined for a plurality of subcarriers allocated to the received signal. In a non-limiting aspect, a per-subcarrier SINR is determined as follows.

$$SINR_k = \frac{E_s}{N_0} |H[k]|^2 \qquad (1)$$

In equation (1), $SINR_k$ denotes the per-subcarrier SINR estimate, $E_s$ denotes the symbol energy, $N_0$ denotes the one-sided white noise power spectral density, H[k] denotes the dispersive channel response for the subcarrier, and k denotes the subcarrier index.

In step 420, the turbo performance estimator 220 determines the per-subcarrier capacities for each of the subcarriers. The per-subcarrier capacity may be determined as follows.

$$C_k = \log(1+SINR_k) \qquad (2)$$

The log in equation (2) may comprise base 2 log calculations, or may comprise other base log calculations or natural log.

Figure 5:
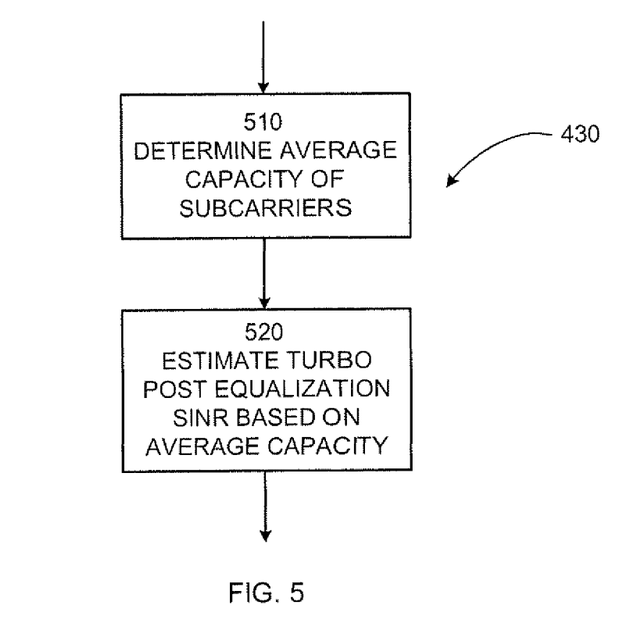
FIG. 5 illustrates an example process to estimate a post-equalization SINR performance based on per-subcarrier capacities.

In step 430, the turbo performance estimator 220 estimates the post-equalization SINR performance $\gamma_T$ of the turbo receiver 210. FIG. 5 illustrates an example process to implement the step 430. First, in step 510, the turbo performance estimator 220 sums and averages the per-subcarrier capacities $C_k$ are to compute an average capacity $C_{AVG}$ as follows.

$$C_{AVG} = \frac{1}{K}\sum_{k=0}^{K-1} C_k \qquad (3)$$

In equation (3), K is the number of subcarriers in the received signal.

The average capacity $C_{AVG}$ is used in step 520 to estimate the SINR performance $\gamma_T$ of the turbo receiver 210 as follows.

$$\gamma_T = \exp(C_{AVG}) - 1 \qquad (4)$$

In equation (4), natural logarithm is assumed to be used in the capacity $C_k$ computation. Thus, the exponential number is used as the base when converting the average capacity $C_{AVG}$ to the post-equalization SINR in equation (4). If other bases are used in the capacity computation $C_k$ of the individual subcarriers, equation (4) should be adjusted accordingly.

By combining equations (1)-(4), the post-equalization SINR $\gamma_T$ is given by equation (5).

$$\gamma_T = \exp\left(\frac{1}{K}\sum_{k=0}^{K-1} \log\left(1 + \frac{E_s}{N_0}\sum_{m=0}^{M-1} |H_m[k]|^2\right)\right) - 1 \qquad (5)$$

In equation (5), M represents a number of receive antennas, and $H_m[k]$ represents the frequency response of the channel corresponding to the $k^{th}$ subcarrier from the transmit antenna to the $m^{th}$ receive antenna.

Generally, noise and interference can exhibit correlation across frequencies and receive antennas. If $R_w[k]$ denotes an M×M correlation matrix corresponding to the $k^{th}$ subcarrier and H[k] represents a vector collecting the frequency responses of the $k^{th}$ subcarrier from the transmitter to all M receive antennas, then the per-subcarrier SINR is determined as follows.

$$SINR_k = E_s H^H[k] R_w^{-1}[k] H[k] \qquad (6)$$

In this equation, the $R_w[k]$ matrix is also referred to as the impairment correlation matrix corresponding to the $k^{th}$ subcarrier. In addition, $H^H[k]$ represents the Hermitian transpose of the vector H[k]. The per-subcarrier capacity and average capacity can still be determined using equations (2) and (3), respectively. Then equation (4) can be used to determine the post-equalization SINR of the turbo receiver 210.

Referring back to FIG. 3, it has been mentioned that in one non-limiting aspect, a comparison is made between the estimated performances of the turbo and linear receivers 210 and 230 $\gamma_T$ and $\gamma_M$ and switching decision in step 340 is made based on the comparison. If a linear minimum mean square error (LMMSE) receiver 210 is assumed, then the post-equalization SINR performance $\gamma_M$ for the LMMSE receiver 210 can be estimated by as follows.

$$\gamma_M = \left( \frac{1}{K} \sum_{k=0}^{K-1} (1 + SINR_k)^{-1} \right)^{-1} - 1 \quad (7)$$

Figure 6:
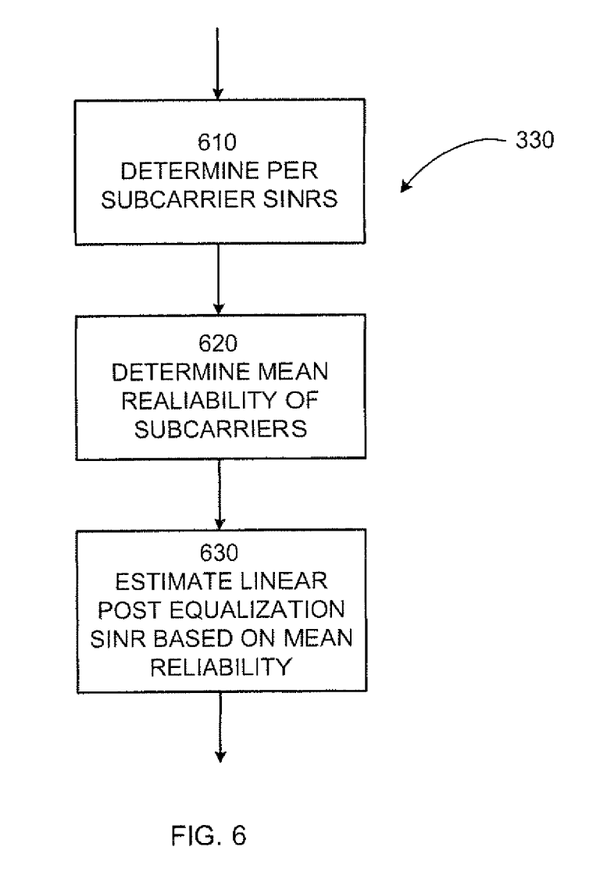
FIG. 6 illustrates an example process to estimate a post-equalization SINR performance of a linear receiver.

FIG. 6 illustrates an example process performed by the linear performance estimator 240 to perform step 330 for estimating the post-equalization SINR performance $\gamma_M$ of the linear receiver 230. In step 610, the linear performance estimator 240 determines per-subcarriers SINRs similar to step 410 performed by the turbo performance estimator 220. In step 620, the linear performance estimator 240 determines a mean reliability of the subcarriers.

In equation (7), the estimated performance $\gamma_M$ of the linear receiver 230 is based on a harmonic mean of the quantity $(1+SINR_k)$. From one perspective, this quantity can be described as a quantitative measure of how much information can be reliably transmitted in one symbol over the $k^{th}$ subcarrier. For example, over a very low noise subcarrier, i.e., $SINR_k \gg 1$, a very high modulation such as 64-QAM may be used. This translates to 6 bits per symbol. Over a moderately low noise subcarrier, 16-QAM may be used meaning that 4 bits can be transmitted in one symbol duration. Note that even in a very noisy environment sometimes described as a power-limited regime, i.e., $SINR_k \approx 0$, some information can still be transmitted (e.g., 1 bit per symbol). Of course, the actual amount of data that can be transmitted will also depend on the coding scheme.

When the quantity $(1+SINR_k)$ is high, more information can be sent reliably in one symbol over the subcarrier. Conversely, when the quantity $(1+SINR_k)$ is low, the amount of information that can be sent in one symbol over the subcarrier is reduced. That is, each $(1+SINR_k)$ quantity represents a quantitative measurement of the subcarrier's reliability. In equation (7), a mean (harmonic mean in this instance) of these reliability measurements is expressed. Thus, in step 630, it can be said that the linear performance estimator 240 determines the estimated performance $\gamma_M$ based on a mean of quantitative reliability measurements of the subcarriers.

Note that the mean of reliability measurements is not limited to the harmonic mean. Other ways to determine central tendencies such as arithmetic mean or geometric mean may be used. In this instance, harmonic mean is used since it is better suited for determining central tendencies when ratios are involved.

Going back to FIG. 3, the switch controller 250 switches the received signal to be equalized by one of the turbo receiver 210 and the linear receiver 230 based on the SINR performances $\gamma_T$ and $\gamma_M$ in step 340.

Figure 7:
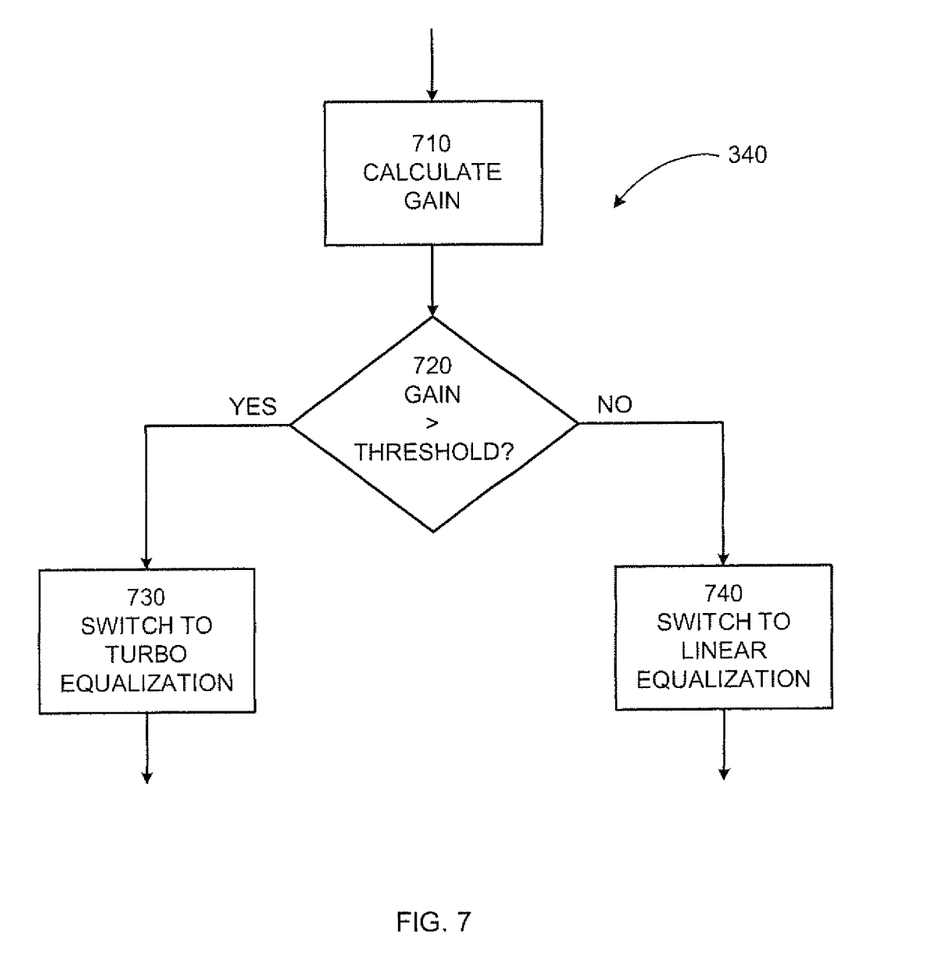
FIGS. 7, 8 and 9 illustrate example processes to switch received signal to be equalized between turbo and linear receivers.

FIG. 7 illustrates an example process performed by the switch controller 250 to implement step 340 when the estimated SINR performances $\gamma_T$ of the turbo receiver 210 and the linear receiver 230 $\gamma_M$ are available. In step 710, the switch controller 250 calculates a gain ratio $G_T$ as follows.

$$G_T = \gamma_T / \gamma_M \quad (9)$$

It should be noted that the gain ratio $G_T$ of equation (9) is merely one of several ways that the estimated performances $\gamma_T$ and $\gamma_M$ can be related. For example, the gain may be expressed as a difference rather than as a ratio. Then in step 420, the switch controller 250 determines whether the gain ratio $G_T$ is greater than a predetermined minimum ratio threshold $G_{MIN}$. When $G_T$ is greater than $G_{MIN}$, the received signal is switched to be equalized by the turbo receiver 210 in step 430. If on the other hand the gain ratio $G_T$ is not greater than $G_{MIN}$, the switch controller 250 switches the received signal to be equalized by the linear receiver 230 in step 440. As mentioned above, the term "switch" should be taken in the broad sense.

But in another non-limiting aspect, the decision as to whether the received signal should be equalized by the turbo receiver 210 or the linear receiver 230 may be made based solely on the post-equalization SINR performance $\gamma_T$ of the turbo receiver 210 estimated by the turbo performance estimator 220 in step 320. In other words, the estimated performance of the linear receiver 230 need not be considered.

Figure 8:
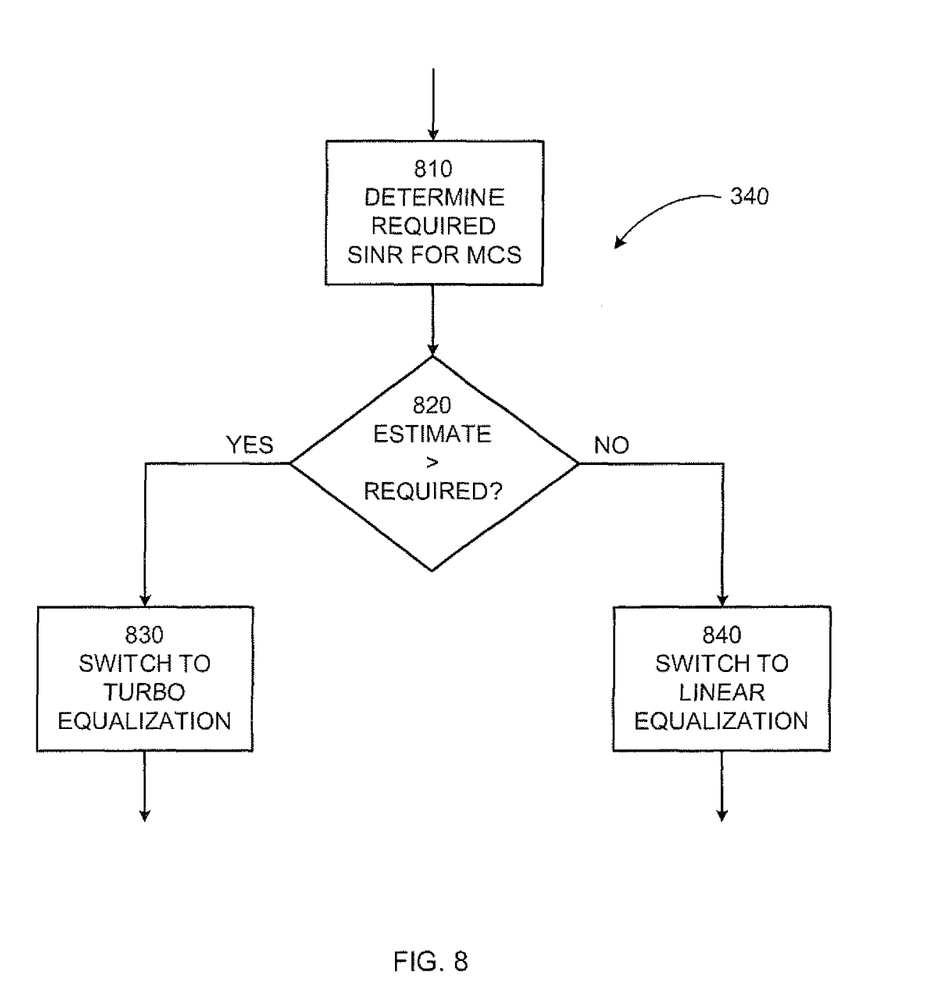

FIG. 8 illustrates a process to perform step 340 without consideration of the estimated performance $\gamma_M$ of the linear receiver 230. In step 810 of the process, the switch controller 250 estimates a required SINR performance $\gamma_{REQUIRED}$ for a modulating encoding scheme (MCS) of the received signal. In step 820, the switch controller 250 determines whether or not the estimated performance $\gamma_T$ of the turbo receiver 210 is greater than required SINR $\gamma_{REQUIRED}$ of the received signals MSC. In step 830, if the estimated performance $\gamma_T$ is determined to be greater than the required SINR $\gamma_{REQUIRED}$ of the received signal's MCS, the switch controller 250 switches the received signal to be equalized by the turbo receiver 210 in step 830. Otherwise, the received signal is switched to be equalized by the linear receiver 230 in step 840.

Figure 9:
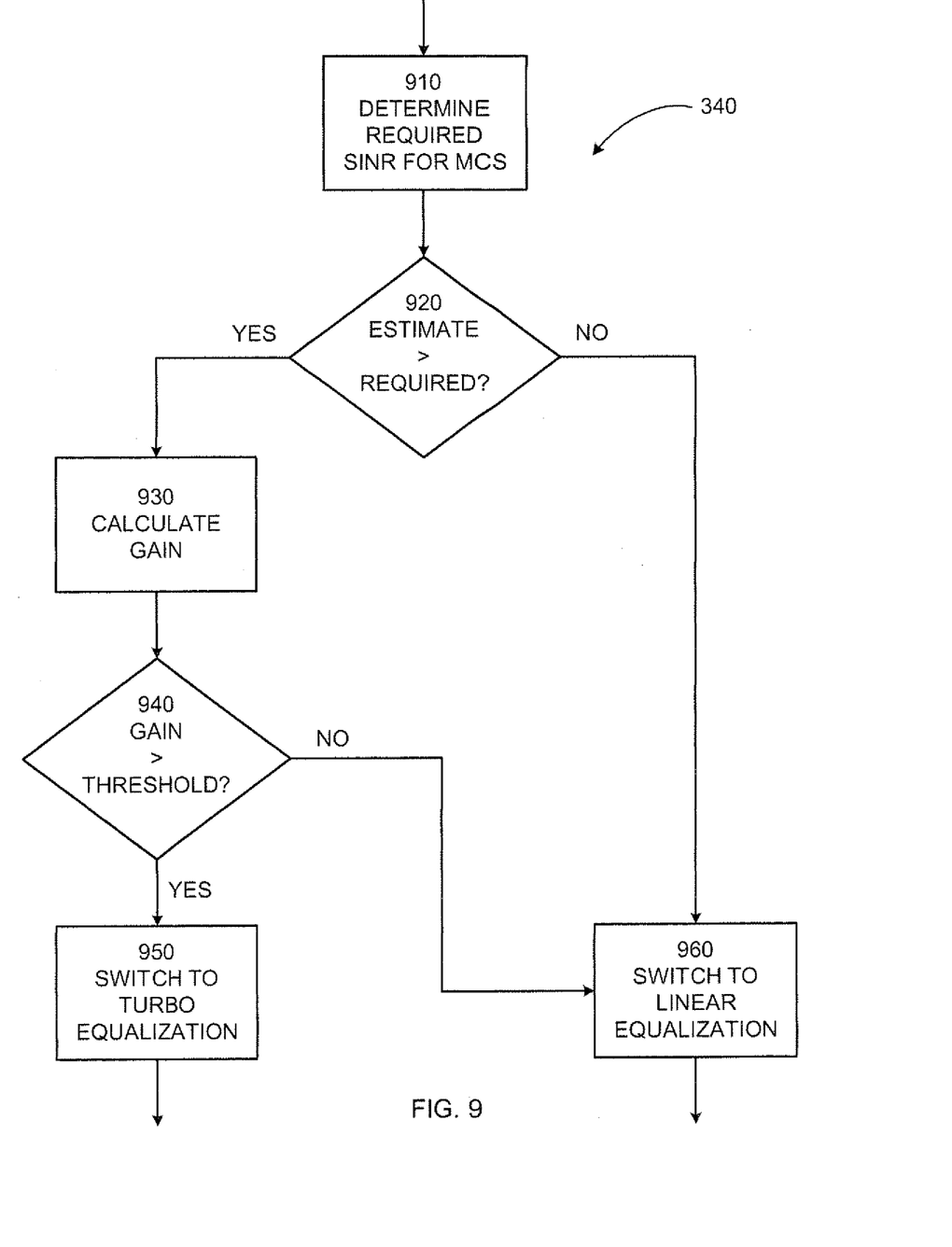

FIG. 9 illustrates another example process to switch the received signal to be equalized between the turbo and linear receivers 210, 230. The process illustrated in FIG. 9 is explained as follows. If the expected performance of the turbo receiver 210 is lower than the required SINR for the receive signal's MCS, there is no expected benefit from using the turbo operation over the linear operation for equalization even if the expected gain of the turbo receiver 210 over the linear receiver 230 is large. In other words, if $\gamma_T$ is less than $\gamma_{REQUIRED}$, whether $G_T$ is large or small can become irrelevant.

Thus, in FIG. 9, the switch controller 250 in steps 910 and 920 determines the required SINR $\gamma_{REQUIRED}$ for the MCS of the received signal, and determines whether or not the estimated post-equalization SINR performance $\gamma_T$ of the turbo receiver 210 is greater than $\gamma_{REQUIRED}$. These steps are similar to steps 810 and 820 illustrated in FIG. 8. If it is determined in step 920 that the estimated performance $\gamma_T$ is good enough, i.e., it is greater than $\gamma_{REQUIRED}$, the estimated performance of the linear receiver 230 is then considered before making the final switching decision. If the estimated SINR performance $\gamma_T$ is not good enough, i.e., $\gamma_T$ is not greater than $\gamma_{REQUIRED}$, then in step 960, the switch controller 250 switches the received signal to be equalized by the linear receiver 230.

If in step 920 the estimated SINR performance $\gamma_T$ of the turbo receiver 210 is greater than the $\gamma_{REQUIRED}$, then the switch controller 250 calculates the gain ratio $G_T$ in step 930. In step 940, the switch controller 250 determines whether or not the gain ratio $G_T$ is greater than the predetermined minimum gain ratio threshold $G_{MIN}$. If the gain ratio $G_T$ is greater than the threshold $G_{MIN}$, then in step 950, the switch controller 250 switches the received signal to be equalized by the turbo receiver 210. Else, the received signal is switched to be equalized by the linear receiver 230 in step 960.

Of the three implementations, illustrated in FIGS. 7, 8 and 9, the process in FIG. 9 is the most intelligent.

Figure 10:
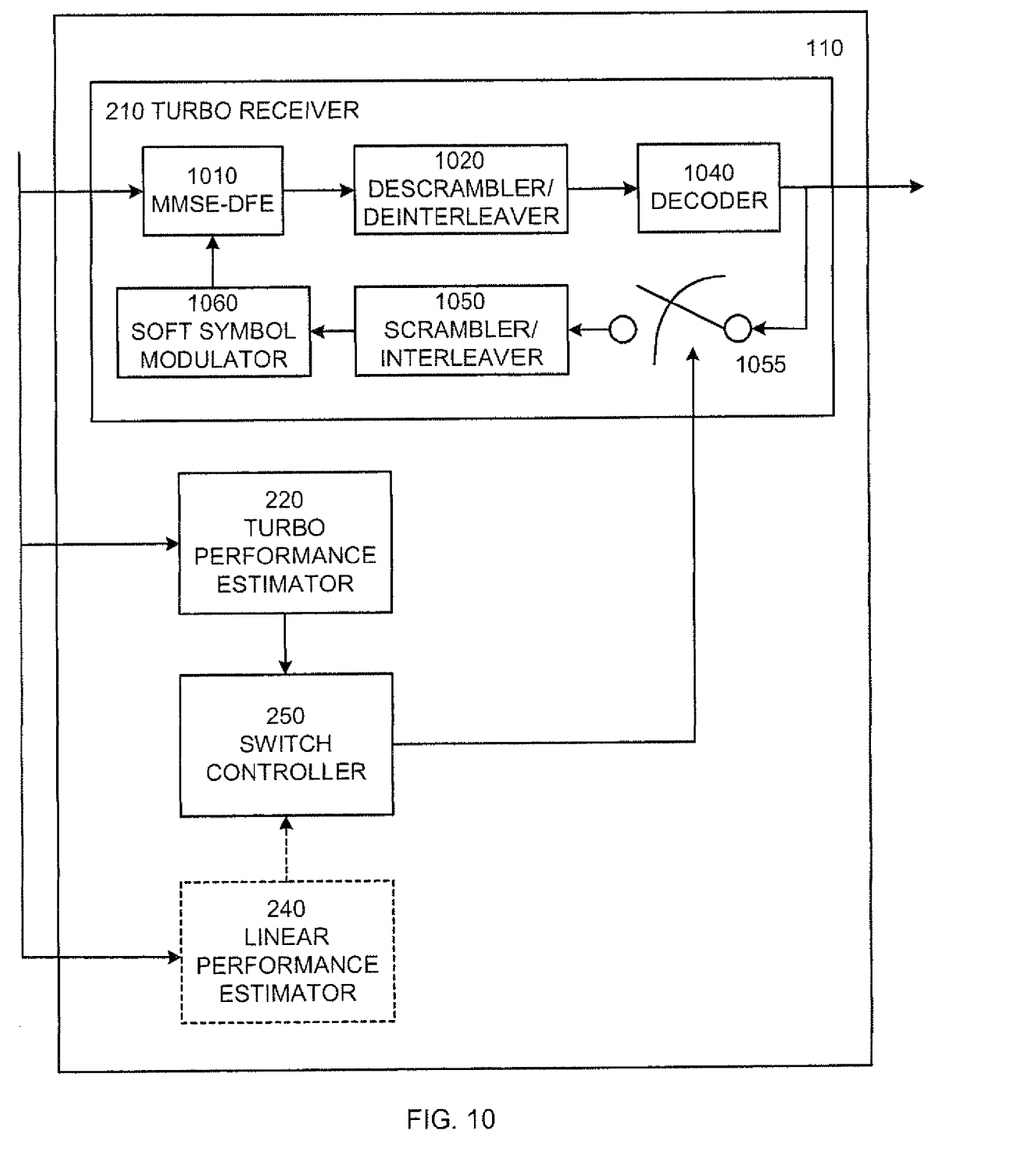
FIG. 10 illustrates an example embodiment of a turbo receiver in a node of a wireless network.

FIG. 10 illustrates an example embodiment of the turbo receiver 210. As seen, the turbo receiver 210 comprises a minimum mean square error decision feedback equalizer (MMSE-DFE) 1010 which outputs an equalized signal based on the received signal, a descrambler/deinterleaver 1020 structured to output a descrambled and deinterleaved signal from the equalized signal, a decoder 1040 structured to output a decoded signal from the descrambled and deinterleaved signal, a scrambler/interleaver 1050 structured to output a scrambled and interleaved signal from the decoded signal, and a soft symbol modulator 1060 structured to output soft symbols, which are estimates of the transmitted symbols, from the scrambled/interleaved signal. The soft symbols are provided to the MMSE-DFE 1010.

The advantage of this turbo receiver 210 is that it can perform both turbo equalization operations as well as linear equalization operations. The turbo receiver 210 performs turbo equalization operations when the switch 1055 is closed to form a feedback loop. If the switch 1055 is opened to thereby disconnect the feedback loop, the MMSE-DFE 1010, the descrambler/deinterleaver 1020 and the decoder 1040 cooperatively function together as the linear receiver. In other words, the output of the decoder 1040 with feedback to the scrambler/interleaver 1050 is equivalent to the received signal being equalized by turbo equalization, and the output of the decoder 1040 without feedback to the scrambler/interleaver 1050 is equivalent to the received signal being equalized by linear equalization.

In this embodiment of the node 110, the switch controller 250 opens and closes the switch 1055 of the turbo receiver 210 to switch the received signal for either the turbo or linear equalization operation. Again, it is emphasized that switching is to be broadly interpreted. Note that switching in this instance can be thought of as activating a turbo mode or linear mode.

One significant advantage of the disclosed subject matter is that the complicated iterative turbo operation can be accurately turned off when the expected performance benefit is small or none.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a node of a wireless network to adaptively switch equalization operations, the method comprising:
    receiving wirelessly a signal from a transmitter;
    estimating a post-equalization signal-to-interference-plus-noise (SINR) performance $\gamma_T$ of a turbo equalization operation based on the received signal; and
    selecting, based on the estimated post-equalization SINR performance $\gamma_T$ of the turbo equalization operation, one of a turbo equalization operation and a linear equalization operation to equalize the received signal,
    wherein the step of estimating the post-equalization SINR performance $\gamma_T$ of the turbo equalization operation comprises:
        determining per-subcarrier SINRs for a plurality of subcarriers allocated to the received signal;
        determining per-subcarrier capacities for the subcarriers allocated to the received signal based on the per-subcarrier SINRs; and
        estimating a post-equalization SINR performance $\gamma_T$ of the turbo equalization operation based on the per-subcarrier capacities of the subcarriers.

2. The method of claim 1, wherein the step of estimating a post-equalization SINR performance $\gamma_T$ of the turbo equalization operation based on the per-subcarrier capacities of the subcarriers comprises:
    determining an average capacity of the subcarriers based on the per-subcarrier capacities of the subcarriers; and
    estimating a post-equalization SINR performance $\gamma_T$ of the turbo equalization operation based on the average capacity of the subcarriers.

3. The method of claim 1, further comprising estimating a post-equalization SINR performance $\gamma_M$ of the linear equalization operation based on the received signal,
    wherein the step of selecting the received signal to be equalized by one of the turbo equalization operation and the linear equalization operation comprises selecting the received signal to be equalized based on both the estimated post-equalization SINR performances $\gamma_T$ of the turbo equalization operation and $\gamma_M$ of the linear equalization operation.

4. The method of claim 2, wherein the step of selecting the received signal to be equalized by one of the turbo equalization operation and the linear equalization operation comprises:
    calculating a gain ratio defined by an equation $G_T = \gamma_T / \gamma_M$;
    determining whether or not the gain ratio $G_T$ is greater than a predetermined minimum gain ratio threshold $G_{MIN}$;
    selecting the received signal to be equalized by the turbo equalization operation when the gain ratio $G_T$ is greater than the minimum gain ratio threshold $G_{MIN}$; and
    selecting the received signal to be equalized by linear equalization operation when the gain ratio $G_T$ is not greater than the minimum gain ratio threshold $G_{MIN}$.

5. The method of claim 3,
    wherein the linear equalization operation is a linear minimum mean square error (LMMSE) equalization operation, and
    wherein the step of estimating the post-equalization SINR performance $\gamma_M$ of the linear equalization operation comprises:
        determining per-subcarrier SINRs for the plurality of subcarriers allocated to the received signal;
        determining a mean reliability of the subcarriers based on the per-subcarrier SINRs; and
        estimating the post-equalization SINR performance $\gamma_M$ of the linear equalization operation based on the mean reliability.

6. The method of claim 1, wherein the step of selecting the received signal to be equalized by one of the turbo equalization operation and the linear equalization operation comprises:
    determining a required SINR $\gamma_{REQUIRED}$ for a modulating and coding scheme (MCS) of the received signal;
    determining whether or not the estimated post-equalization SINR performance $\gamma_T$ of the turbo equalization operation is greater than the required SINR $\gamma_{REQUIRED}$ of the received signal's MCS; and selecting the received signal to be equalized by the linear equalization operation when the estimated post-equalization SINR performance $\gamma_T$ of the turbo equalization operation is not greater than the required SINR $\gamma_{REQUIRED}$ of the received signal's MCS.

7. The method of claim 6, further comprising selecting the received signal to be equalized by the turbo equalization operation when the estimated post-equalization SINR performance $\gamma_T$ of the turbo equalization operation is greater than the required SINR $\gamma_{REQUIRED}$ of the received signal's MCS.

8. The method of claim 6, further comprising:
estimating a post-equalization SINR performance $\gamma_M$ of the linear equalization operation based on the received signal;
calculating a gain ratio defined by an equation $G_T = \gamma_T/\gamma_M$ when the estimated post-equalization SINR performance $\gamma_T$ of the turbo equalization operation is greater than the required SINR $\gamma_{REQUIRED}$ of the received signal's MCS;
determining whether or not the gain ratio $G_T$ is greater than a predetermined minimum gain ratio threshold $G_{MIN}$;
selecting the received signal to be equalized by the turbo equalization operation when the gain ratio $G_T$ is greater than the minimum gain ratio threshold $G_{MIN}$; and
selecting the received signal to be equalized by the linear equalization operation when the gain ratio $G_T$ is not greater than the minimum gain ratio threshold $G_{MIN}$.

9. The method of claim 8,
wherein the linear equalization operation is a linear minimum mean square error (LMMSE) equalization operation, and
wherein the step of estimating the post-equalization SINR performance $\gamma_M$ of the linear equalization operation comprises:
determining per-subcarrier SINRs for the plurality of subcarriers allocated to the received signal; and
determining a mean reliability of the subcarriers based on the per-subcarrier SINRs; and
estimating the post-equalization SINR performance $\gamma_M$ of the linear equalization operation based on the mean reliability.

10. A node of a wireless network structured to adaptively switch equalization operations, the node comprising:
a turbo receiver structured to perform a turbo equalization operation on a received signal;
a linear receiver structured to perform a linear equalization operation on the received signal;
a turbo performance estimator structured to estimate a post-equalization signal-to-interference-plus-noise (SINR) performance $\gamma_T$ of the turbo receiver based on the received signal; and
a switch controller structured to switch the received signal to be equalized by one of the turbo receiver and the linear receiver based on the estimated post-equalization SINR performance $\gamma_T$ of the turbo receiver,
wherein the turbo performance estimator is structured to estimate the post-equalization SINR performance $\gamma_T$ of the turbo receiver by
determining per-subcarrier SINRs for a plurality of subcarriers allocated to the received signal,
determining per-subcarrier capacities for the subcarriers allocated to the received signal based on the per-subcarrier SINRs, and
estimating a post-equalization SINR performance $\gamma_T$ of the turbo receiver based on the per-subcarrier capacities of the subcarriers.

11. The node of claim 10, wherein the turbo performance estimator is structured to estimate the post-equalization SINR performance $\gamma_T$ of the turbo receiver based on the per-subcarrier capacities of the subcarriers by
determining an average capacity of the subcarriers based on the per-subcarrier capacities of the subcarriers, and
estimating a post-equalization SINR performance $\gamma_T$ of the turbo receiver based on the average capacity of the subcarriers.

12. The node of claim 10, further comprising a linear performance estimator structured to estimate a post-equalization SINR performance $\gamma_M$ of the linear receiver based on the received signal,
wherein the switch controller is structured to switch the received signal to be equalized by one of the turbo receiver and the linear receiver based on both the estimated post-equalization SINR performances $\gamma_T$ of the turbo receiver and $\gamma_M$ of the linear receiver.

13. The node of claim 12, wherein the switch controller is structured to:
calculate a gain ratio defined by an equation $G_T = \gamma_T/\gamma_M$,
determine whether or not the gain ratio $G_T$ is greater than a predetermined minimum gain ratio threshold $G_{MIN}$,
switch the received signal to be equalized by the turbo receiver when the gain ratio $G_T$ is greater than the minimum gain ratio threshold $G_{MIN}$, and
switch the received signal to be equalized by linear receiver when the gain ratio $G_T$ is not greater than the minimum gain ratio threshold $G_{MIN}$.

14. The node of claim 12,
wherein the linear receiver is a linear minimum mean square error (LMMSE) receiver, and
wherein the linear performance estimator is structured to estimate the post-equalization SINR performance $\gamma_M$ of the linear receiver by
determining per-subcarrier SINRs for the plurality of subcarriers allocated to the received signal,
determining a mean reliability of the subcarriers based on the per-subcarrier SINRs, and
estimating the post-equalization SINR) performance $\gamma_M$ of the linear receiver based on the mean reliability.

15. The node of claim 10, wherein the switch controller is structured to:
determine a required SINR $\gamma_{REQUIRED}$ for a modulating and coding scheme (MCS) of the received signal,
determine whether or not the estimated post-equalization SINR performance $\gamma_T$ of the turbo receiver is greater than the required SINR $\gamma_{REQUIRED}$ of the received signal's MCS, and
switch the received signal to be equalized by linear receiver when the estimated post-equalization SINR performance $\gamma_T$ of the turbo receiver is not greater than the required SINR $\gamma_{REQUIRED}$ of the received signal's MCS.

16. The node of claim 15, wherein the switch controller is further structured to switch the received signal to be equalized by the turbo receiver when the estimated post-equalization SINR performance $\gamma_T$ of the turbo receiver is greater than the required SINR $\gamma_{REQUIRED}$ of the received signal's MCS.

17. The node of claim 15, further comprising a linear performance estimator structured to estimate a post-equalization SINR performance $\gamma_M$ of the linear receiver based on the received signal, and wherein the switch controller is further structured to:
- calculate a gain ratio defined by an equation $G_T = \gamma_T/\gamma_M$ when the estimated post-equalization SINR performance $\gamma_T$ of the turbo receiver is greater than the required SINR $\gamma_{REQUIRED}$ of the received signal's MCS,
- determine whether or not the gain ratio $G_T$ is greater than a predetermined minimum gain ratio threshold $G_{MIN}$,
- switch the received signal to be equalized by the turbo receiver when the gain ratio $G_T$ is greater than the minimum gain ratio threshold $G_{MIN}$, and
- switch the received signal to be equalized by linear receiver when the gain ratio $G_T$ is not greater than the minimum gain ratio threshold $G_{MIN}$.

18. The node of claim 17,
wherein the linear receiver is a linear minimum mean square error (LMMSE) receiver, and
wherein the linear performance estimator is structured to estimate the post-equalization SINR performance $\gamma_M$ of the linear receiver by
- determining per-subcarrier SINRs for the plurality of subcarriers allocated to the received signal,
- determining a mean reliability of the subcarriers based on the per-subcarrier SINRs, and
- estimating the post-equalization SINR) performance $\gamma_M$ of the linear receiver based on the mean reliability.

19. The node of claim 17, wherein the turbo receiver comprises:
- a minimum mean square error decision feedback equalizer (MMSE-DFE) structured to output an equalized signal based on the received signal;
- a descrambler/deinterleaver structured to output a descrambled/deinterleaved signal from the equalized signal;
- a decoder structured to output a decoded signal from the descrambled signal;
- a scrambler/interleaver structured to output a scrambled/interleaved signal from the decoded signal; and
- a soft symbol modulator structured to output soft symbol signal from the scrambled/interleaved signal, wherein the MMSE-DFE is structured to output the equalized signal also based on the soft symbol signal when the soft symbol signal is output from the scrambler, and
wherein the output of the decoder with feedback to the scrambler/interleaver is equivalent to the received signal being equalized by turbo equalization, and the output of the decoder without the feedback to the scrambler/interleaves is equivalent to the received signal being equalized by the linear equalization.

20. A non-transitory computer storage medium storing therein programming instructions, which when executed by a computer, the computer executes a method to adaptively switch equalization operations at a node of a wireless network, the method comprising:
- receiving wirelessly a signal from a transmitter;
- estimating a post-equalization signal-to-interference-plus-noise (SINR) performance $\gamma_T$ of a turbo equalization operation based on the received signal; and
- selecting, based on the estimated post-equalization SINR performance $\gamma_T$ of the turbo equalization operation, one of a turbo equalization operation and a linear equalization operation to equalize the received signal, wherein the step of estimating the post-equalization SINR performance $\gamma_T$ of the turbo equalization operation comprises:
- determining per-subcarrier SINRs for a plurality of subcarriers allocated to the received signal;
- determining per-subcarrier capacities for the subcarriers allocated to the received signal based on the per-subcarrier SINRs; and
- estimating a post-equalization SINR performance $\gamma_T$ of the turbo equalization operation based on the per-subcarrier capacities of the subcarriers.

\* \* \* \* \*

UNITED STATES PATENT AND TRADEMARK OFFICE
CERTIFICATE OF CORRECTION

PATENT NO. : 8,467,439 B2  Page 1 of 1
APPLICATION NO. : 13/117583
DATED : June 18, 2013
INVENTOR(S) : Wang et al.

It is certified that error appears in the above-identified patent and that said Letters Patent is hereby corrected as shown below:

In the Drawings:

In Fig. 6, Sheet 6 of 10, in Box "620", in Line 2, delete "REALIABILITY" and insert -- RELIABILITY --, therefor.

In the Specifications:

In Column 2, Line 62, delete "DESCRIPTION" and insert -- BRIEF DESCRIPTION --, therefor.

In the Claims:

In Column 12, Line 45, in Claim 14, delete "SINR)" and insert -- SINR --, therefor.

In Column 13, Line 25, in Claim 18, delete "SINR)" and insert -- SINR --, therefor.

In Column 14, Lines 9-10, in Claim 19, delete "scrambler/interleaves" and insert -- scrambler/interleaver --, therefor.

Signed and Sealed this
Twenty-ninth Day of October, 2013

Teresa Stanek Rea
*Deputy Director of the United States Patent and Trademark Office*